US011137582B2

(12) United States Patent
Giordano et al.

(10) Patent No.: US 11,137,582 B2
(45) Date of Patent: Oct. 5, 2021

(54) OMNIDIRECTIONAL CATADIOPTRIC LENS WITH ODD ASPHERIC CONTOUR OR MULTI-LENS

(71) Applicant: SPHERE OPTICS COMPANY, LLC, Syracuse, NY (US)

(72) Inventors: Meyer J. Giordano, Syracuse, NY (US); Robert S. Englert, Jamesville, NY (US); Christopher Cotton, Honeoye Falls, NY (US); W. David Schmidt, LeRoy, NY (US)

(73) Assignee: SPERE OPTICS COMPANY, LLC, Syracuse, NY (US)

( * ) Notice: Subject to any disclaimer, the term of this patent is extended or adjusted under 35 U.S.C. 154(b) by 534 days.

(21) Appl. No.: 16/064,763

(22) PCT Filed: Dec. 23, 2016

(86) PCT No.: PCT/US2016/068482
§ 371 (c)(1),
(2) Date: Jun. 21, 2018

(87) PCT Pub. No.: WO2017/117039
PCT Pub. Date: Jul. 6, 2017

(65) Prior Publication Data
US 2021/0072518 A1 Mar. 11, 2021

Related U.S. Application Data

(60) Provisional application No. 62/271,462, filed on Dec. 28, 2015.

(51) Int. Cl.
*G02B 13/06* (2006.01)
*G02B 27/00* (2006.01)
(Continued)

(52) U.S. Cl.
CPC .......... *G02B 13/06* (2013.01); *G02B 27/0025* (2013.01); *G03B 17/565* (2013.01); *H04N 5/2254* (2013.01)

(58) Field of Classification Search
CPC .. G02B 13/06; G02B 27/0025; G03B 17/565; H04N 5/2254
(Continued)

(56) References Cited

U.S. PATENT DOCUMENTS

| 4,976,524 A | 12/1990 | Chiba |
| 6,115,193 A | 9/2000 | Shu |

(Continued)

FOREIGN PATENT DOCUMENTS

| CN | 1558289 A | 12/2004 |
| CN | 2921860 Y | 7/2007 |

(Continued)

OTHER PUBLICATIONS

Russian Patent Office International Search Report dated Apr. 20, 2017 re PCT application of Sphere Optics Company, LLC, Serial No. PCT/US2016/68482, filed Dec. 23, 2016.
(Continued)

*Primary Examiner* — William Choi
(74) *Attorney, Agent, or Firm* — Patrick J. Daugherty; Daugherty & Del Zoppo Co. LPA

(57) ABSTRACT

A generally conical element is defined about a vertical axis and having a tip on the vertical axis, and a generally conical odd aspheric contour mirror surface that is defined upward from the tip relative to the vertical axis. A toroidal lens element, disposed to capture light data input of a surrounding scene reflected from the odd aspheric contour mirror surface, has a cross-section shape defined relative to a plane passing through the toroidal lens element and including the vertical axis and is defined by revolving a convex or concave
(Continued)

lens surface cross-section shape around the vertical axis, the convex or concave lens surface cross-section shape defined from another axis parallel to the vertical axis but offset, wherein the toroidal lens element cross-sectional shape is constant in rotation about the vertical axis and imparts a toroid shape to the toroidal lens element relative to the vertical axis.

13 Claims, 13 Drawing Sheets

(51) Int. Cl.
*G03B 17/56* (2021.01)
*H04N 5/225* (2006.01)

(58) Field of Classification Search
USPC .................. 359/709, 711, 725, 728, 743
See application file for complete search history.

(56) References Cited

U.S. PATENT DOCUMENTS

| | | | |
|---|---|---|---|
| 7,300,185 | B1 | 11/2007 | Ruffin et al. |
| 8,798,451 | B1 | 8/2014 | Kweon |
| 9,182,228 | B2 | 11/2015 | Pollock et al. |
| 2008/0100928 | A1 | 5/2008 | Wilson |
| 2012/0062691 | A1 | 3/2012 | Fowler |
| 2015/0176776 | A1 | 6/2015 | Pelka et al. |

FOREIGN PATENT DOCUMENTS

| | | |
|---|---|---|
| CN | 201527991 U | 7/2010 |
| CN | 102033300 A | 4/2011 |
| CN | 102235594 A | 11/2011 |
| CN | 104254733 A | 12/2014 |
| CN | 203981961 U | 12/2014 |
| CN | 104595848 A | 5/2015 |
| WO | 2009102445 A2 | 8/2009 |
| WO | 2015009083 A1 | 1/2015 |

OTHER PUBLICATIONS

Cheng, et al., Design of an Image Transferring System Used for Panoramic Annular Imaging, Photoelectric Engineering, Apr. 30, 2002, vol. 29, Issue 2, English translation of abstract.

Hu, et al., Annular lens design for reducing spherical aberration, Optical Technology, Nov. 30, 2007, vol. 33, English translation of abstract.

OMNIDIRECTIONAL CATADIOPTRIC LENS WITH ODD ASPHERIC CONTOUR OR MULTI-LENS

FIELD OF THE INVENTION

Aspects of the present invention relate to capturing visual image information from a surrounding environment for use in photographic recreations and representations.

BACKGROUND

Photographic depictions, transmissions, recreations and representations of the real world may capture image information representative of visible physical surroundings by using lens elements to focus light information on recording or transmission mediums (for example, camera sensors, film, light sensitive arrays, etc.) Images may be captured and stored for later viewing, or transmitted live, to a wide variety of end users both locally and distantly located relative to the environment providing the imagery.

Virtual reality (VR) refers to the replacement of sensory perception data of an environment inhabited by a user with computer-generated data, in some aspects to enable a user to experience an entirely different world from the present physical location of the user. For example, a user at home during cold winter months may engage a VR device to convey imagery and sounds from a beach vacation destination many miles away. Augmented reality (AR) refers to presentations of combinations of real-world and generated elements, sometimes by processing a camera feed through a computer to add generated elements before displaying it to the user, such as a heads-up display of navigation routing overlay that is superimposed on a camera feed of a street presently being travelled by the user. Some systems may provide both VR and AR capabilities, wherein an AR display device that blends real-world camera image feeds with computer generated data may be used to generate VR displays by dropping the real-world image data from a camera feed, leaving only generated or artificial world views.

SUMMARY OF INVENTION

Aspects include systems that comprise:

a generally conical element defined about a vertical axis and having a tip on the vertical axis, and a generally conical odd aspheric contour mirror surface that is defined upward from the tip relative to the vertical axis; and a toroidal lens element disposed to receive reflected light from the odd aspheric contour mirror surface, wherein the toroidal lens element has a cross-section shape defined relative to a plane passing through the toroidal lens element and including the vertical axis and is defined by revolving a convex or concave lens surface cross-section shape around the vertical axis, wherein the convex or concave lens surface cross-section shape is defined from another axis that is parallel to the vertical axis but offset by an offset distance, and wherein the toroidal lens element cross-sectional shape is constant in rotation about the vertical axis and imparts a generally toroid shape to the toroidal lens element relative to the vertical axis; and wherein the cross-sectional shape of the toroidal lens element is selected to capture light data input of a surrounding scene that is reflected from the generally conical odd aspheric contour mirror surface, and to translate the captured light data into image projection data directed toward at least one of an image plane for receipt by at least one light sensitive sensor, and another lens system.

In some systems the generally conical odd aspheric contour mirror surface corrects for visual distortion or chromatic aberrations.

Aspects include methods for capturing image information from a surrounding scene, comprising:

capturing light input from a surrounding scene via at least one lens element that is disposed about a generally conical element that is defined about a vertical axis and having a tip on the vertical axis, and a generally conical odd aspheric contour mirror surface that is defined upward from the tip relative to the vertical axis; and translating, via a toroidal lens element disposed to receive reflected light from the odd aspheric contour mirror surface, the captured light input into projection data that is oriented toward at least one of an image plane for receipt by at least one light sensitive sensor, and another lens system; and wherein the toroidal lens element has a cross-section shape defined relative to a plane passing through the toroidal lens element and including the vertical axis and is defined by revolving a convex or concave lens surface cross-section shape around the vertical axis, wherein the convex or concave lens surface cross-section shape is defined from another axis that is parallel to the vertical axis but offset by an offset distance, and wherein the toroidal lens element cross-sectional shape is constant in rotation about the vertical axis and imparts a generally toroid shape to the toroidal lens element relative to the vertical axis; and wherein the cross-sectional shape of the toroidal lens element is selected to capture the light data input of a surrounding scene that is reflected from the generally conical odd aspheric contour mirror surface and to translate the captured light data into the image projection data directed toward the at least one of an image plane for receipt by at least one light sensitive sensor and the another lens system.

Aspects also include methods for capturing image information from a surrounding scene, comprising:

re-arranging or forming image projection data of image circles of a plurality of individual lenses into different, complementary curvilinear shapes; and combining the different, complementary curvilinear shapes into a combination image that fills an image sensor area.

In some methods the image projection data is polar projection data, said methods further comprising:

converting the image polar projection data into *rectalinear* visual information; and generating a photographic representation of the surrounding scene from the rectilinear visual information; or combining the different, complementary curvilinear shapes into the combination image that fills the image sensor area by combining the rectilinear visual information.

Aspects include computerized methods of any of the aspects described above, wherein software is provided as a service in a cloud environment.

Aspects include products that comprise any feature described in the specification herein, either individually or in combination with any feature, in any configuration.

DETAILED DESCRIPTION

The ability to acquire visual imagery and image information over a full 360 degree horizontal by 180 degree vertical field of view (an "omnidirectional" field of view) is desirable for VR video production and other applications. Examples include first person remote control of robotics, surveillance and security monitoring, exploration of inaccessible spaces (collapsed structures, the interior of the human body), computer vision, and still others will be apparent to one skilled in the art.

Figure 1:
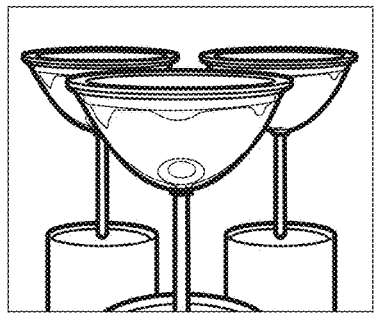
FIG. 1 is a graphic illustration of a prior art parabolic mirrors structure.
Figure 2:
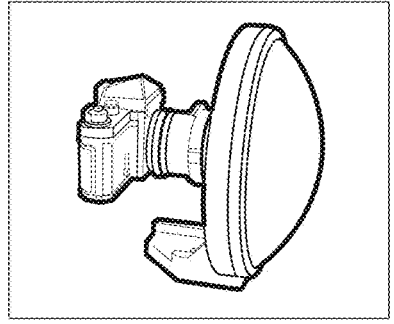
FIG. 2 is a graphic illustration of a prior art extreme fisheye lens structure.

FIG. 1 illustrates a prior art parabolic mirrors structure. A curved mirror mounted in front of a normal camera lens reflects light coming in from all angles horizontally into the camera. Examples include devices provided by GoPano.com, The 0-360 Panoramic Optic™ by 0-360.com, and the "Eye mirror" provided by eye-mirror.com. FIG. 2 illustrates a prior art extreme fisheye lens structure, a conventional photographic fisheye lens with an extremely wide angle. Examples include a 6 mm fisheye lens by Nikon; an "iboolo" 235 degree Super Fisheye Lens; the 360Fly by VOXX Electronics Corp (360fly.com); and the "ibi" by Tamaggo (tamaggo.com) that provides a 360×200 degree field of view.

Figure 4:
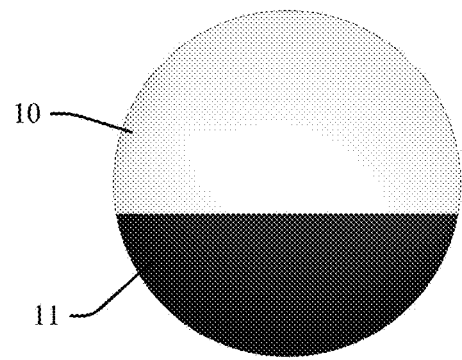
FIG. 4 is a graphic illustration of field of view coverage of a fisheye lens according to the present invention.
Figure 5:
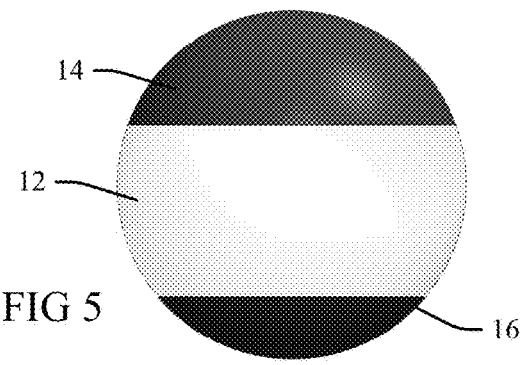
FIG. 5 is a graphic illustration of field of view coverage of a parabolic mirror lens according to the present invention.

Conventional fish eye and parabolic lens may provide a horizontal field of view with a full 360 degrees of coverage, but the vertical angle is limited. As illustrated in FIG. 4, a conventional fisheye lens with a rated field of view of 200 degrees actually creates a 360×100 degree projection that covers one pole completely within an upper area 10 that is little more than half of a total spherical field of view, but omitting a lower area 11 including an opposing pole and much of the surrounding hemisphere, leaving this lower area 11 blank in any generated image. As shown in FIG. 5, one prior art parabolic mirror covers a central 60 degree strip of image 12 over 360 degrees of horizontal coverage, leaving large gaps 14 and 16 in coverage at the upper and lower poles of the sphere, respectively.

Figure 3:
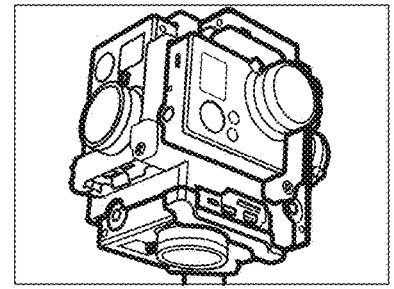
FIG. 3 is a graphic illustration of a prior art multi-camera panorama structure.

FIG. 3 illustrates a prior art multi-camera panorama structure, wherein the cameras are arranged radially such that their respective images have overlap. Recorded visual data may be stitched into one 360 degree image, wherein image data is extracted from each camera individually and then digitally processed in order to create a final image. However, the results are prone to stitching errors due to issues with camera alignment or frame synchronization. Stitching errors are often manifested as visible seams or other disjointed or unaligned image data perceived at the overlap of the stitched images.

Aspects of the present invention provide systems and methods for capturing fully spherical (360×180 degree field of view) images and videos while using a single lens assembly and a single camera. Embodiments include a central mirror element with a mirror surface angled to about 45 degrees and revolved into a cone shape about a central vertical axis. Other, outer refractive elements are disposed about the central mirror element relative to the central vertical axis and focus image light information acquired from the environment from an entire span of 360 degrees of horizontal perspective about the assembly onto the central mirror element mirror surface, which via the 45 degree orientation of the mirror surface, reflects or bends the light information oriented horizontally (generally along the horizontal, x-axis) 90 degrees straight down vertically toward an image receiver (camera, human eye, film, light sensor array elements, etc.)

PCT Application No. PCT/US2014/060855 by RAM Industrial Designs, Inc., filed on Oct. 16, 2014, which is commonly assigned with the present application, is hereby incorporated in its entirety by reference, and is sometimes referred to as "the 855 patent application." The 855 patent application provides systems and methods for capturing fully spherical (360×180 degree field of view, or 4 pi steradians) images and videos while using a single lens assembly and a single camera that include a central mirror element with a mirror surface angled to about 45 degrees and revolved into a cone shape about a central vertical axis. Other, outer refractive elements are disposed about the central mirror element relative to the central vertical axis and focus image light information acquired from the environment from an entire span of 360 degrees of horizontal perspective about the assembly onto the central mirror element mirror surface, which, via the 45 degree orientation of the mirror surface, reflects or bends the light information oriented horizontally (generally along the horizontal, x-axis) 90 degrees straight down vertically toward an image receiver (camera, human eye, film, light sensor array elements, etc.)

Aspects of the present invention improve the systems and methods disclosed in the 855 patent application, in order to improve the optical quality of the resulting image, for example to mitigate astigmatism and lack of field flatness in some circumstances, among other optical aberrations. Aspects of the present invention include at least two refinements to the systems taught by the 855 patent application: an addition of an odd aspheric contour to the conical reflecting element, and the inclusion of a flat toroidal element to received reflected light data from the conical reflecting element.

Figure 6:
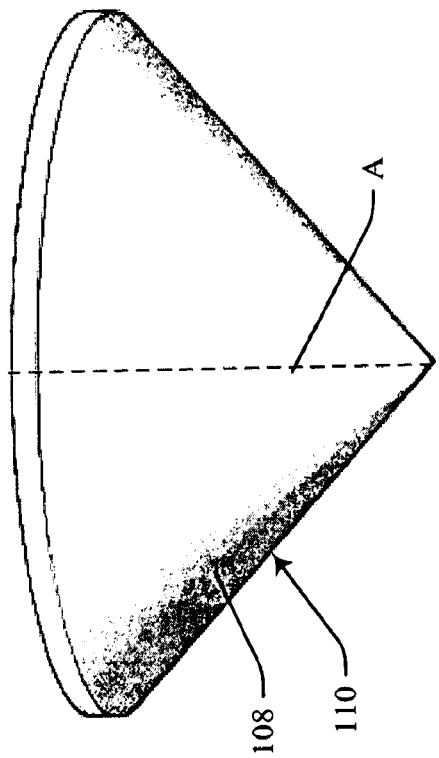
FIG. 6 is a graphic illustration of an embodiment of the present invention.
Figure 6:
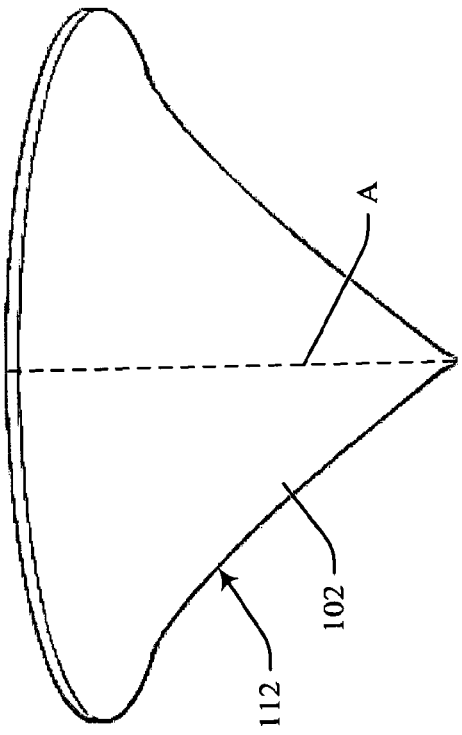

More particularly, referring to FIG. 6, a first improvement is an adjustment to the surface of the system's reflecting element. In the 855 patent application, a reflective conical element 108 has a surface 110 generally defined on an angle of 45 degrees relative to a central axis A, with allowance for deviation from an exact straight 45 degree cone shape in order to correct for optical aberrations. The present embodiment replaces this element and surface with a reflecting element 102 that has an odd aspheric contour surface 112 defined with respect to its a central axis A. This improvement is an elaboration on the aforementioned aberration correction.

Figure 7:
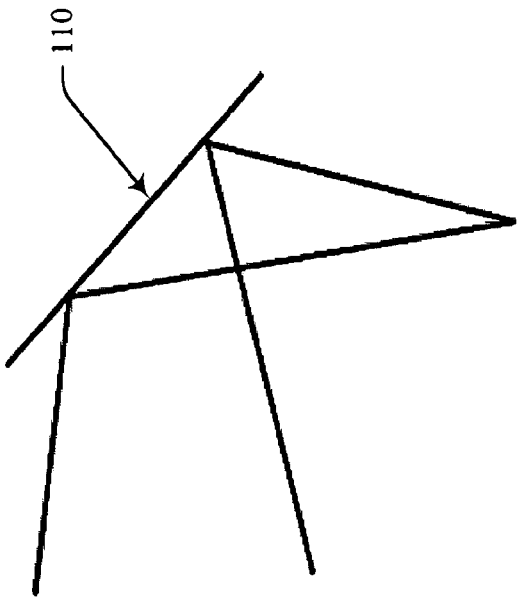
FIG. 7 is a graphic illustration of an embodiment of the present invention.
Figure 7:
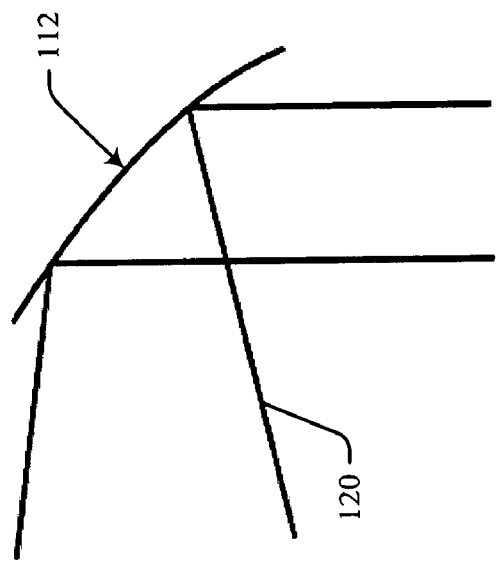

As illustrated in FIG. 7, by altering the surface of the reflecting element 102 to form the odd aspheric contour surface 112, the surface 112 of the mirror element 102 itself serves as a focusing element, rather than exclusively as a means of changing the angle of incoming light captured by other elements, such as the outer toroidal elements taught in the 855 patent application. The odd aspheric curve surface 112 alters the light path 120, while the straight angle surface 110 does not.

As will be understood by one skilled in the art, aspheric surfaces can take a wide variety of forms, and in some examples aspheric lenses are designed with surfaces of a form defined by expression [1]:

$$z(r) = (r^2/R(1+\sqrt{1-(1+k)r^2/R^2})) + \alpha_1 r^2 + \alpha_2 r^4 + \alpha_3 r^6 + \ldots \quad [1]$$

Wherein the optic axis is presumed to lie in the "z" direction, and "z(r)" is the "sag" (the z-component of the displacement of the surface from the vertex, at distance "r" from the central axis). The coefficients "$\alpha_i$" each describe respective deviations of the surface from the axially symmetric quadric surfaces specified by "R" and "κ."

Odd aspheric lenses are lenses where the curve of the lens is described by a polynomial function that contains odd-number exponents (as opposed to normal aspheric lenses that contain only even exponents). The odd aspheric model deviation is similar to an even aspheric model, except both even and odd powers of "r" are used, wherein the sag may be defined by expression [2]:

$$z = (cr^2/(1+\sqrt{1-(1+k)c^2r^2})) + \beta_1 r^1 + \beta_2 r^2 + \beta_3 r^3 + \beta_4 r^4 + \beta_5 r^5 + \beta_6 r^6 + \beta_7 r^7 + \beta_8 r^8 \quad [2]$$

However, it will be understood that this is only one example, and the exact odd aspheric curve to be used in a particular application is determined by the requirements of the rest of the optical system.

Figure 8:
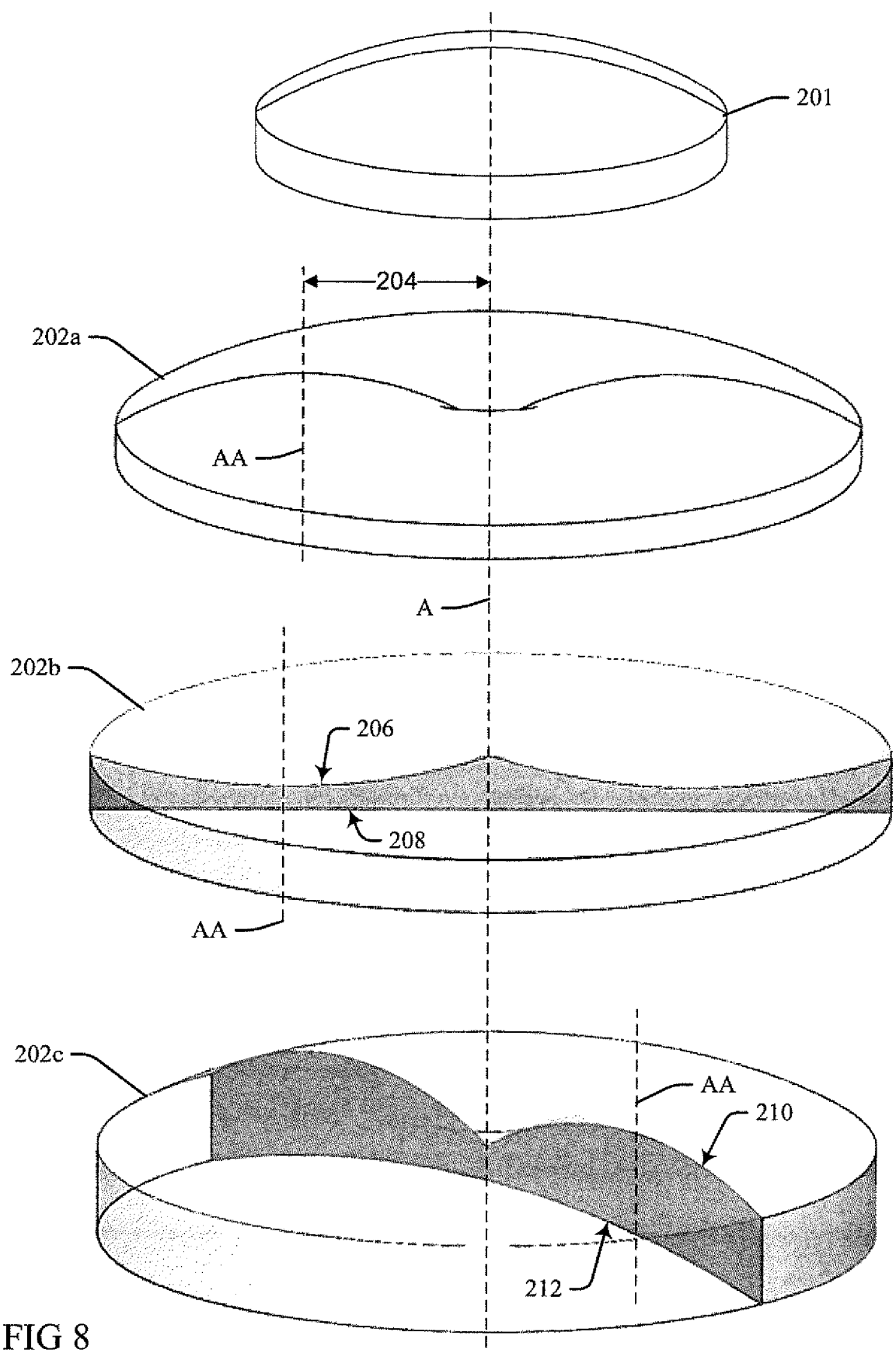
FIG. 8 is a graphic illustration of an embodiment of the present invention.

Referring now to FIG. 8, a second improvement over the 855 patent application embodiments is the inclusion of another type of toroidal lens element 202 positioned after the reflecting element 102. A typical plano-convex lens element 201 may be formed via rotation of a cross-section shape about its optical axis A. In contrast, the toroidal lens element 202a according to the present invention is formed by revolving a standard lens element cross-section, such as the cross-section of the prior art lens 201, or any other shape (convex, concave, etc.) around an axis AA that is parallel to its optical axis A but offset by some distance 204 that may be selected to correspond to the incoming reflected light from the reflector element.

Thus, in the present example, toroidal element example 202a is defined by rotating the cross-section shape of the lens 201 about the offset axis AA. Example 202b is an alternative embodiment formed by rotating a plano-concave shape about the offset axis AA that has a concave top surface 206 and a planar bottom surface 208. Alternative embodiment 202c has a toroidal convex top surface 210 and a concave opposite surface 212.

This new toroidal form of the element 202 is configured to match a revolved light path created by the odd aspheric curve surface 112 of the conical reflector/mirror element 102 to facilitate the conversion of this revolved light path into a shape that can be more readily focused by succeeding conventionally-formed lenses.

Figure 9:
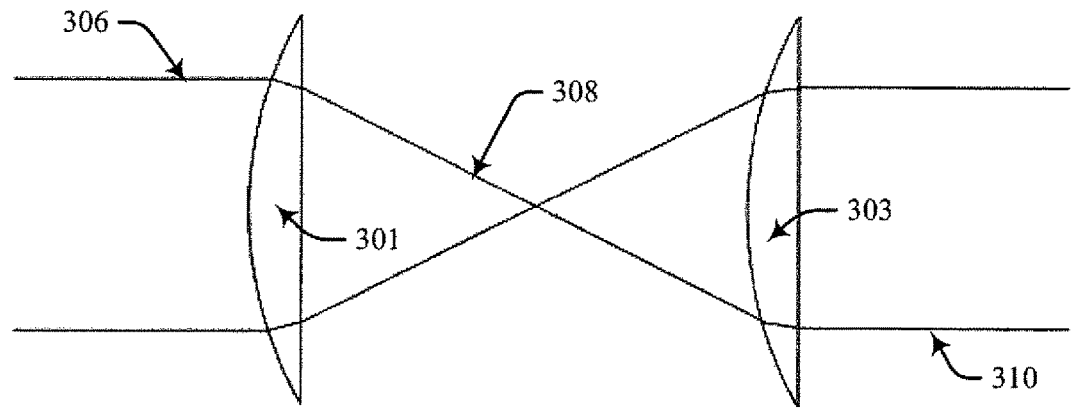
FIG. 9 is a graphic illustration of an optical configuration of lenses according to the present invention.
Figure 10:
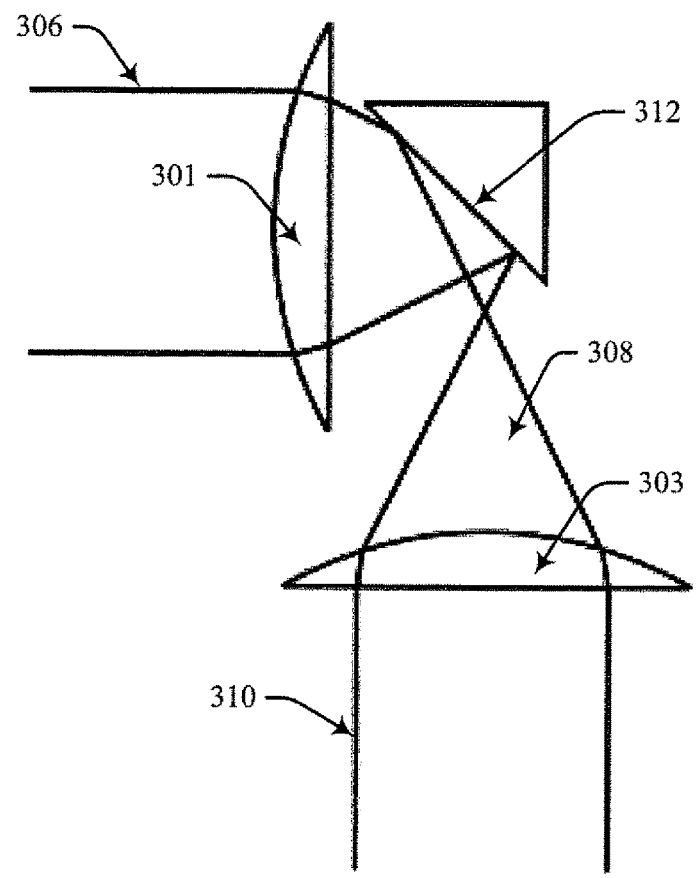
FIG. 10 is a graphic illustration of an optical configuration of lenses according to the present invention.

FIG. 9 illustrates a basic, common optical configuration of cross-sectional views of two plano-convex lenses 301 and 303, wherein an input beam of parallel light rays 306 pass through a first lens element 301 that converges them into a converging orientation 308, and they then pass through the second element 303 which restores the rays to a parallel orientation 310. FIG. 10 illustrates a mirror surface 312 placed between the two lenses 301 and 303 at 45 degrees relative to the direction of the input beam 306, which redirects the generated output beam 310 by 90 degrees relative to the input beam 306. In aspects of the present invention, the mirror surface 312 generally has the shape of the odd aspheric contour surface 112, though in some embodiments it may have the straight angle surface 110.

Figure 11:
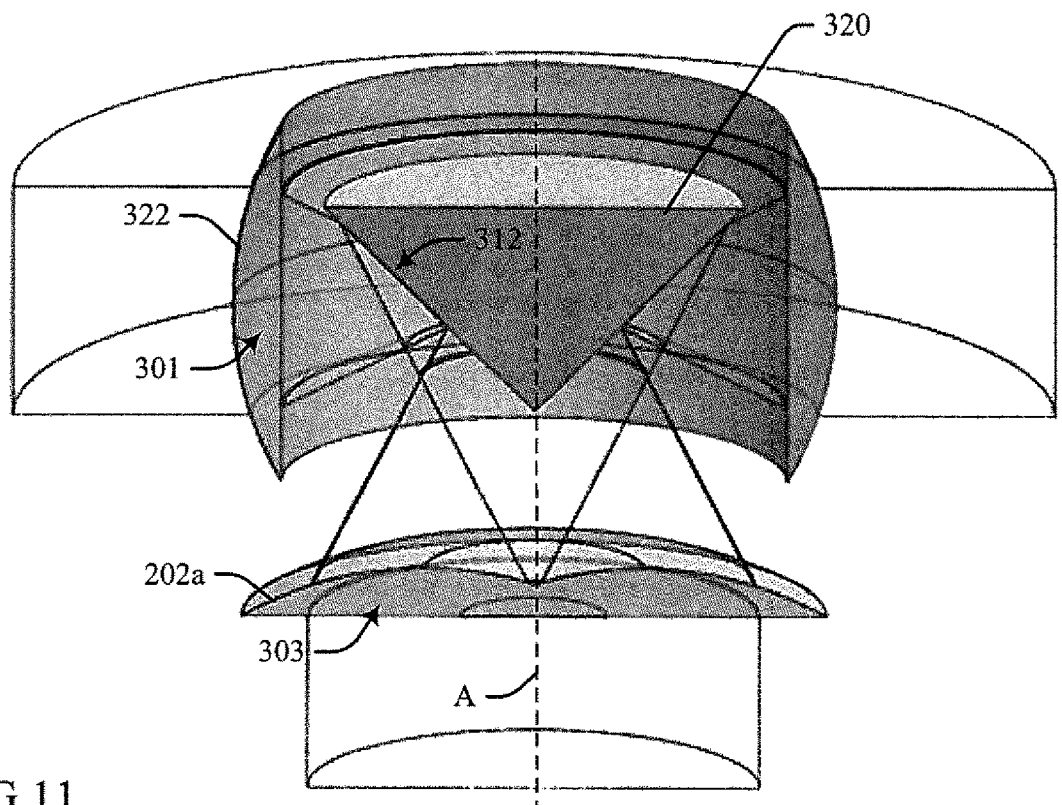
FIG. 11 is a graphic illustration depicting cross-sectional lens shapes according to the present invention.

FIG. 11 is an illustration of revolving the cross-sectional shapes of the system according to FIG. 10 about an optical axis A, wherein the mirror element surface 312 defines a generally conical element 320, the first lens element cross-sectional shape 301 defines a toroidal element 322, and the second lens element cross-sectional shape 303 defines the toroidal lens element with the flat bottom surface 202a.

Figure 12:
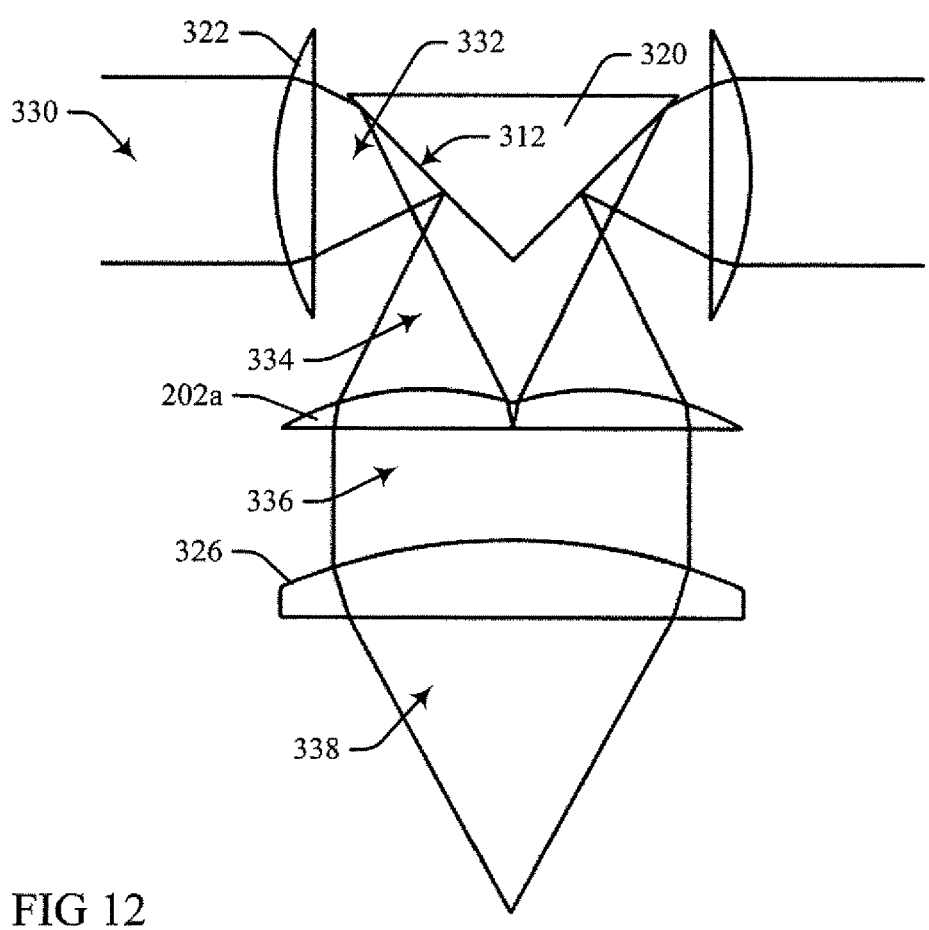
FIG. 12 is a graphic illustration of transformation of light rays by lenses according to the present invention.

FIG. 12 illustrates the transformation of input light rays 330 by the system of FIG. 11. The toroidal element 322 transforms (focuses, refracts, etc.) the input light rays 330 into an output beam of rays 332 that are reflected into a downward beam 334 from the mirror surface 312 and coalesced into an output beam form or orientation 336 by the toroidal lens element 202a which may then be focused into a focused output 338 by one or more subsequent lens elements 326 as needed.

Figure 13:
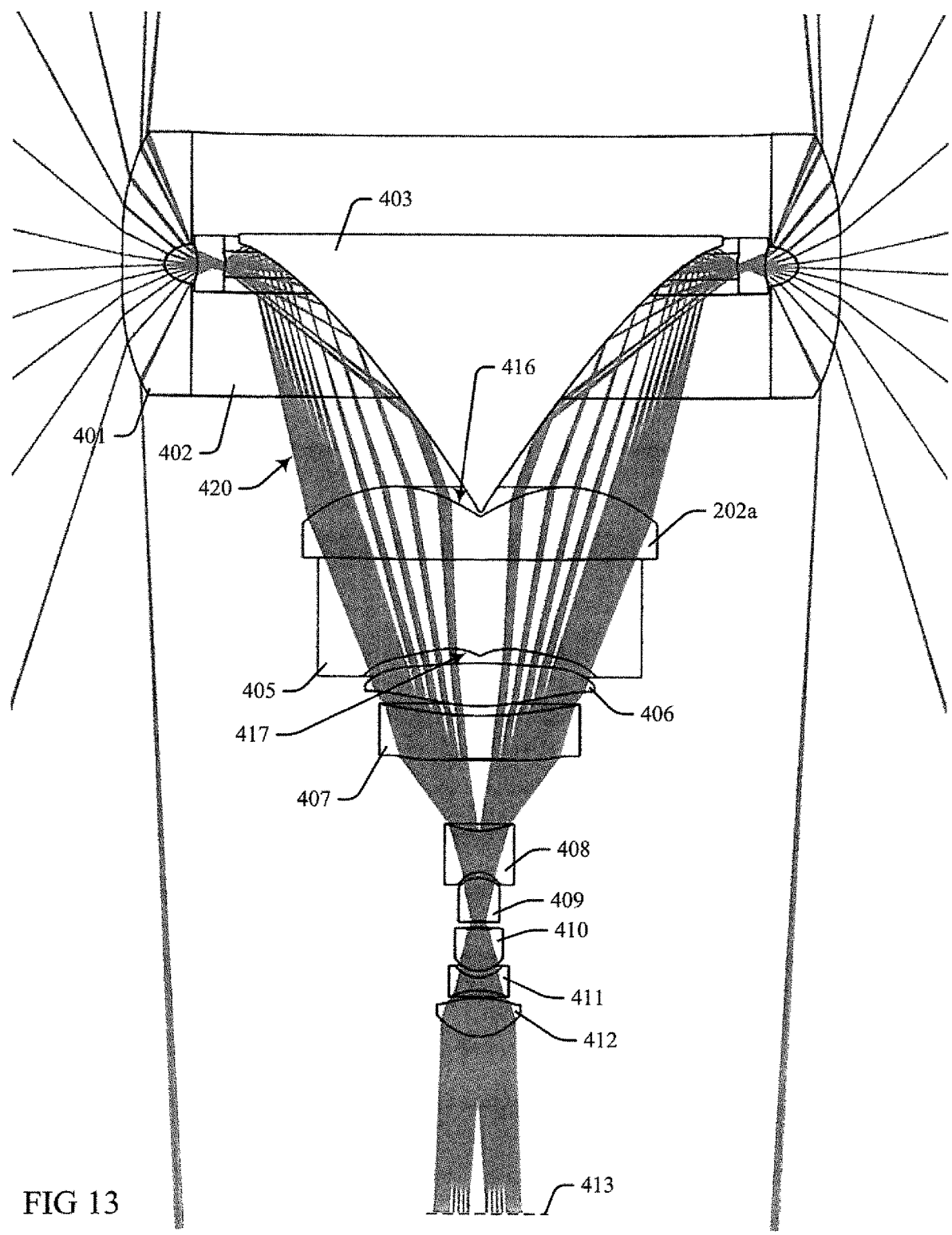
FIG. 13 is a graphic illustration of a cross-sectional view of an image-forming lens system according to the present invention.

FIG. 13 is a cross-sectional view of one example of a complete image-forming lens system according to the present invention that is depicted with respect to its focusing and transforming effects on light rays 420 passing through the respective elements of the system, namely: an outer toroidal element with an aspheric cross-section 401; an inner toroidal (aspheric cross-section) 402; a conical reflector with an odd aspheric reflecting surface (as described above) 403; a doublet element comprising a combination of the flat toroidal (achromatic doublet) element 202a with an achromatic toroidal element 405 that has a flat top surface and a toroidal bottom surface 417, wherein respective top and bottom surfaces 416 and 417 are formed by revolving a non-planar lens element cross-section shape (convex, concave, etc.) around an axis parallel to its optical axis but offset by some distance, as described above; odd aspheric elements 406 and 407; and aspheric/spheric elements 408, 409, 410, 411 and 412 that focus the final output of the light rays 420 onto an image plane 413.

Figure 14:
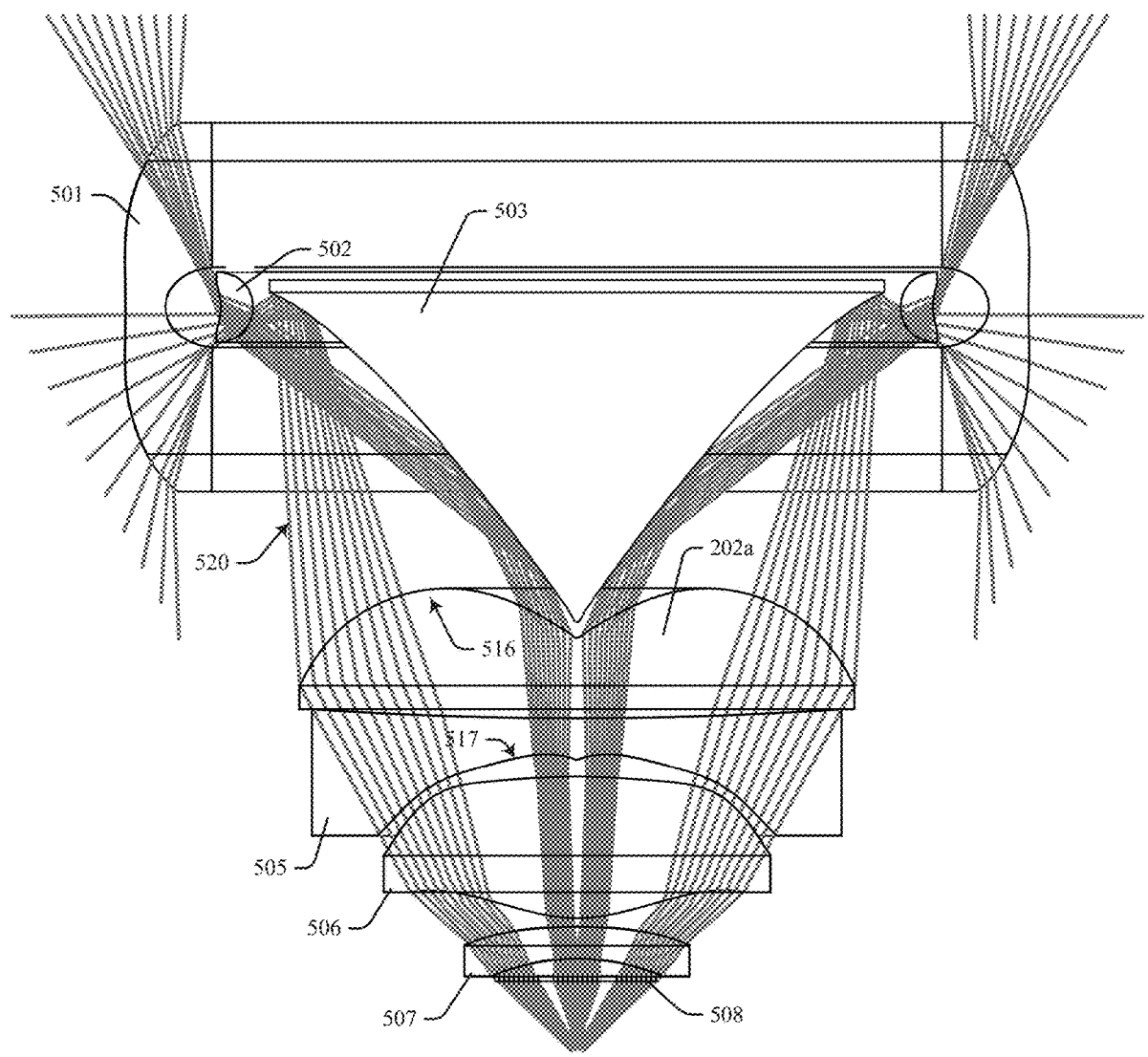
FIG. 14 is a graphic illustration of a cross-sectional view of a lens-converter system according to the present invention.

FIG. 14 is a cross-sectional view of an example of a lens-converter system according to the present invention that mounts in front of an existing wide-angle image-forming lens system and that is depicted with respect to its focusing and transforming effects on light rays 520 passing through the respective elements of the system, namely: an outer toroidal element (with aspheric cross-section) 501; an inner toroidal element (with aspheric cross-section) 502; a conical reflector with an odd aspheric reflecting surface (formed as described above) 503; a doublet element comprising a combination of the flat toroidal (achromatic doublet) element 202a with another achromatic toroidal element 505 that has a flat top surface and a toroidal bottom surface 517, wherein respective top and bottom surfaces 516 and 517 are formed by revolving a non-planar lens element cross-section shape (convex, concave, etc.) around an axis parallel to its optical axis but offset by some distance, as described above; and odd aspheric elements 506 and 507 that that focus the final output of the light rays 520 upon a wide-angle lens 508 of another imaging lens system.

Aspects of the present invention provide advantages over other approaches, including improvements to the systems and methods described in the 855 patent application. Modification of the reflector element of the 855 patent application with the odd aspheric surface contour according to the present invention enables the reflector element to act as a focusing element in addition to reflecting the light collected from outer/inner toroidal elements downwards. Incorporation of one or more "flat" toroidal elements according to the present invention after the reflector element focuses the reflected light rays into a configuration that can be more effectively focused by subsequent conventional lens elements. Together, these improvements mitigate optical aberrations such as astigmatism and field flatness that may cause significant image degradation or focusing difficulty with basic implementations taught by the 855 patent application.

In embodiments that incorporate outer fish-eye lens elements, the fish-eye may provide an effective vertical field of view of approximately 180 degrees, which is the entire or the maximum field of view vertically. More particularly, 180 degrees vertical span will be understood as defined by a semicircle drawn on a radius from the zero point on a vertical axis that is normal to a horizontal axis (or a horizontal plane defined by a plurality of horizontal axes oriented toward different degrees of 360 of horizontal coverage), thus starting and ending at positive and corresponding negative points of the radius value on the vertical axis. Wherein a fish eye lens structure is disposed entirely (360 degrees) about the vertical axis shared with the conical mirror element, said central mirror element reflects light information downward comprehensive enough to create a panoramic, 360 degrees horizontal field of view about whatever vertical field of view is provided by the surrounding reflective and refractive lens elements. Elements according to the present invention may be described as "generally toroidal" with respect to an axis, in that their respective two-dimensional cross-section shapes or profiles are constant throughout a rotational perspective about the axis, resulting in a three-dimensional toroid (or toroidal) form. However, the adjective "generally toroidal" refers to a shape resulting from maintaining the constant cross-section shape relative to an axis, and it will be understood to be non-limiting with regard to the shape of the cross-sections and their resulting element forms.

It will also be understood that the light rays 120, 306, 308, 310, 330, 332, 334, 336, 338, 420 and/or 520 depicted or otherwise discussed herein may represent captured light input from a surrounding scene that passes through the element described above to be reflected, redirected and otherwise translated into an orientation comprising image projection data that may be focused via a focus array or other focusing optics into a focused projection toward an image plane for receipt by one or more light sensitive sensors (film element, array of electrical sensors, the retina of a human eye, etc.).

Alternative aspects of the present invention may incorporate a wide variety of lens cross-sections and configurations and transform them from conventional dimensions by revolving ("wrapping") them about a vertical axis A that is shared with the generally conical odd aspheric contour surface 112.

Figure 15:
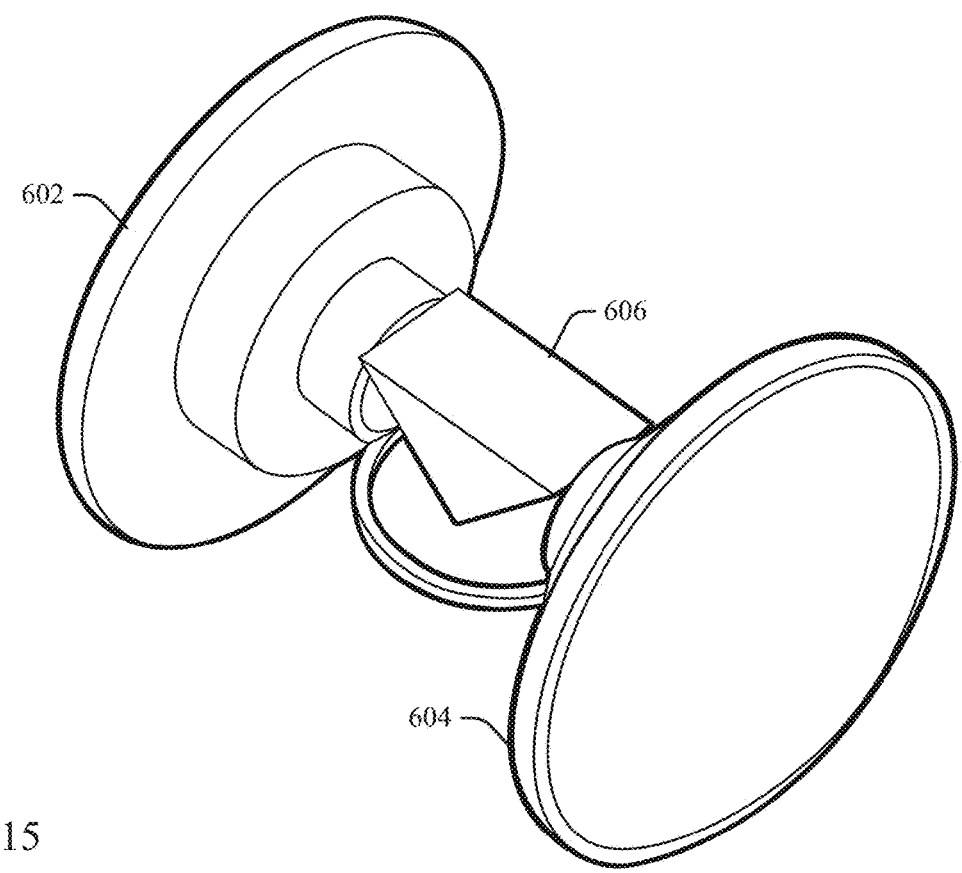
FIG. 15 is a graphic illustration of a top-perspective view of a multi-lens panoramic imaging assembly according to the present invention.
Figure 16:
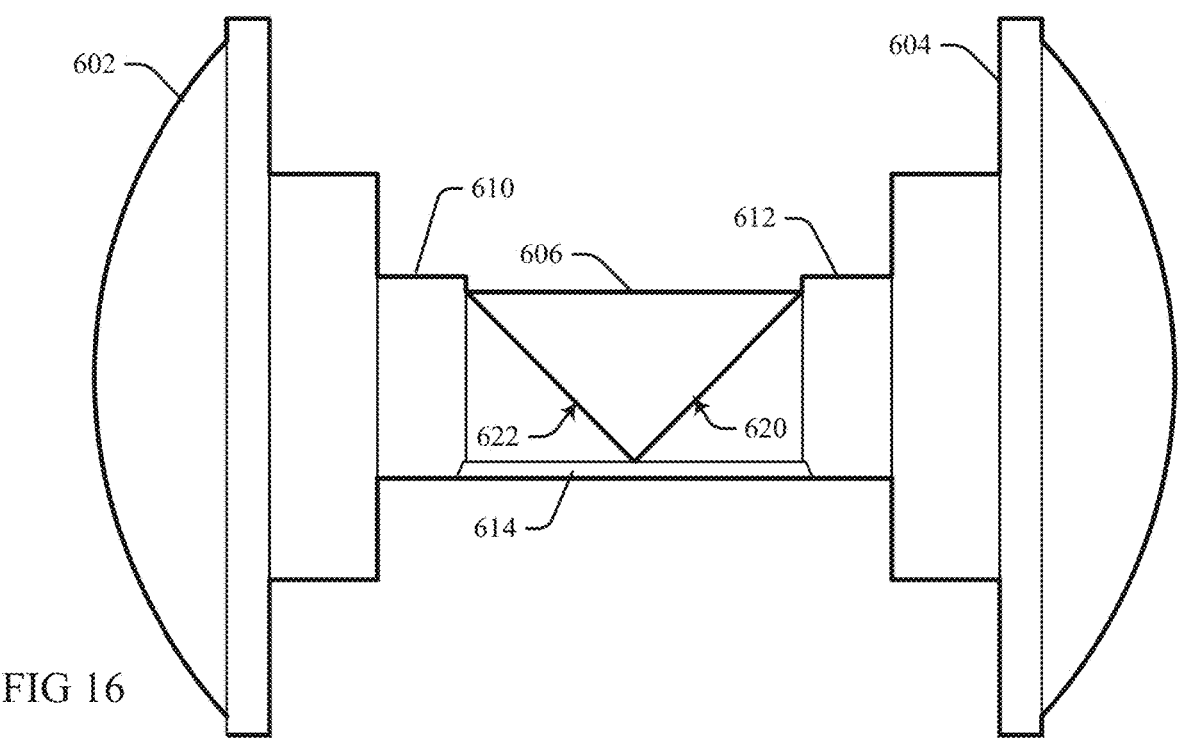
FIG. 16 is a graphic illustration of a side view of the multi-lens panoramic imaging assembly of FIG. 15.
Figure 17:
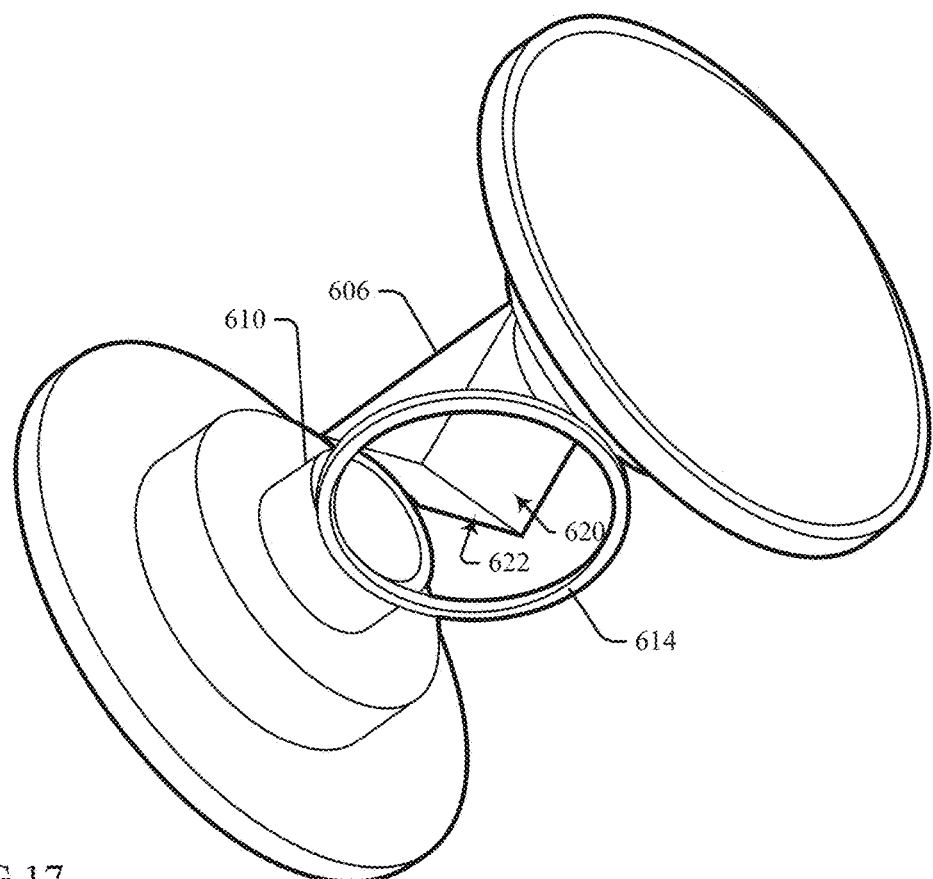
FIG. 17 is a graphic illustration of a bottom-perspective view of the multi-lens panoramic imaging assembly of FIG. 15.

FIG. 15 is a top-perspective view of a multi-lens panoramic imaging assembly according to another aspect of the present invention that comprises two fisheye lenses 602 and 604 with a mirrored reflector element 606 disposed therebetween. FIG. 16 is a side view, and FIG. 17 is a bottom-perspective view, of the multi-lens panoramic imaging assembly of FIG. 15. It will be understood that this embodiment is an illustrative but not limiting or exhaustive example: for example, either of the lenses 602 and 604 may be other than a fisheye lens.

It is desirable to develop a system for capturing fully spherical (360×180 degree field of view) images and videos using a single camera. Existing solutions in this field either require multiple cameras covering the full spherical view, which is subsequently stitched into a single image, or use of a single camera with a fisheye lens with an angle of view greater than 180 degrees, or a catoptric mirror, which can capture the full field of view horizontally, but not vertically.

Embodiment of the present invention provide an assembly through which two or more conventional lenses (for example, 602 and 604), preferably with a combined field of view greater than 360 degrees, are provided in an orientation relative to each other that is mountable to a single camera (or image sensor) such that the single camera captures the projected images from all of the attached lenses in a single frame. These images can then be stitched together digitally to form a single 360 degree image. The individual lenses used should have a sufficiently large field of view that there is some overlap with adjacent lenses in the system, in order to minimize artifacts when the images are combined.

The basic implementation of the system involves the placement of a reflective element 606 behind each lens unit 602 and 604 which allows the redirection of the projected images regardless of the actual positioning of the lens 602 and 604. This component 606 commonly has mirrored reflective surfaces 620 and 622, but could also be a prism, fiber, or any other means of redirecting a light path. In addition to the reflector element, a relay lens assembly may be generally provided to control the focus and size of the projected images. Relay elements may be placed before and after the reflector element, for example, relay elements 610, 612 and 614.

Figure 18:
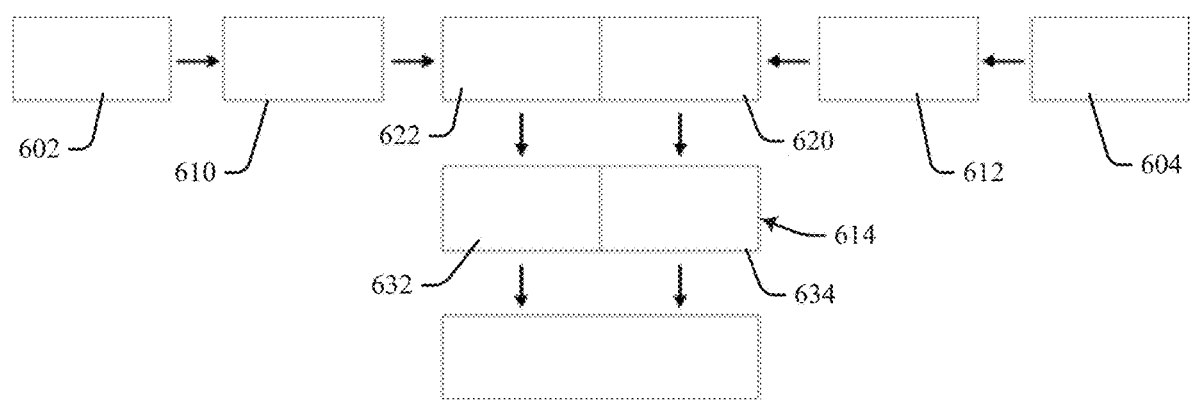
FIG. 18 is a schematic illustration of a multi-lens panoramic imaging assembly according to the present invention.

FIG. 18 provides a schematic illustration of another example of the embodiment of FIGS. 15-17, wherein the relay element 614 is a pair of lenses 632 and 634 that are each aligned to receive reflected light image data from one each of the mirror reflectors 622 and 620.

Figure 19:
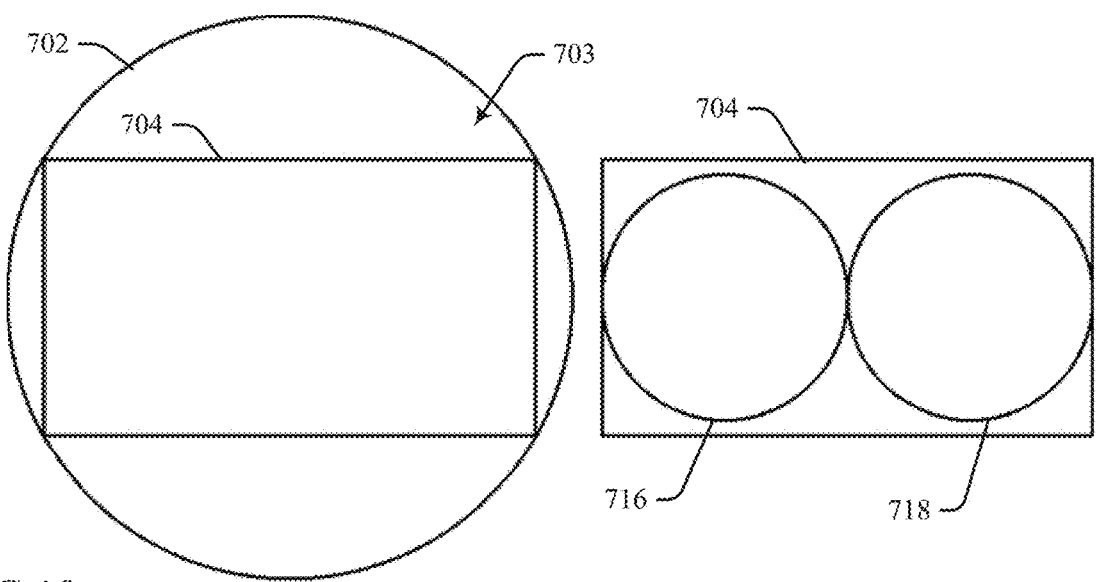
FIG. 19 is a graphic illustration of image outputs of lens elements relative to image sensor elements according to the present invention.
Figure 20:
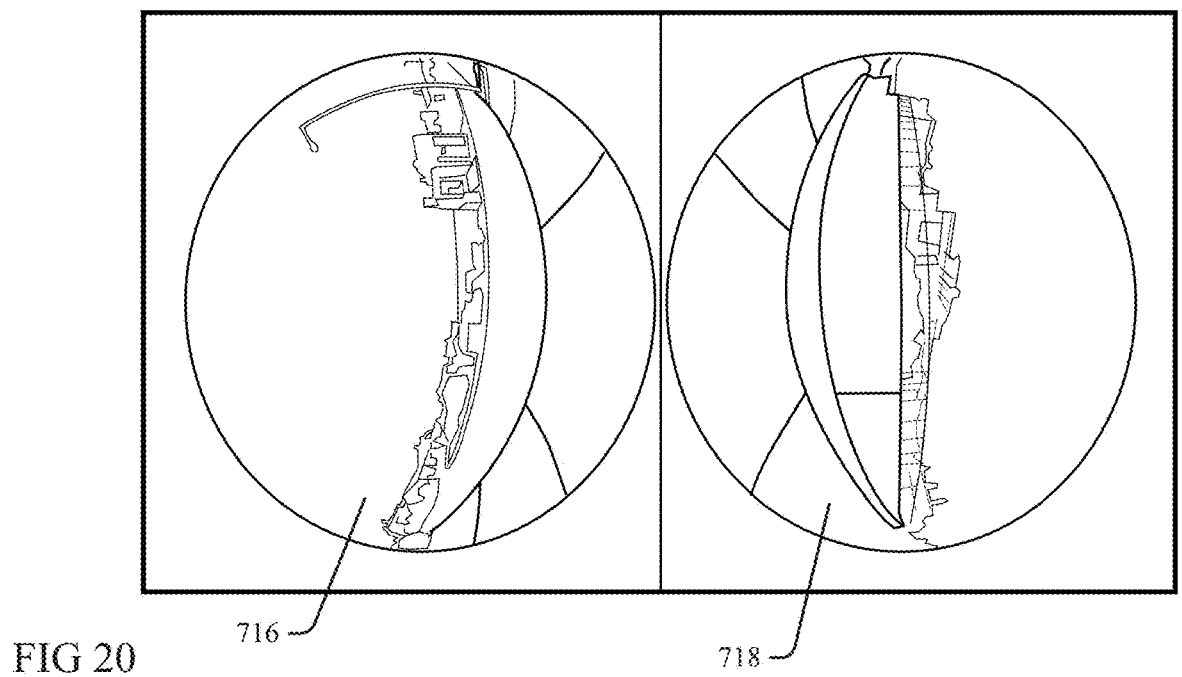
FIG. 20 is a graphic illustration of projected visual information of image outputs of lens elements according to the present invention.
Figure 21:
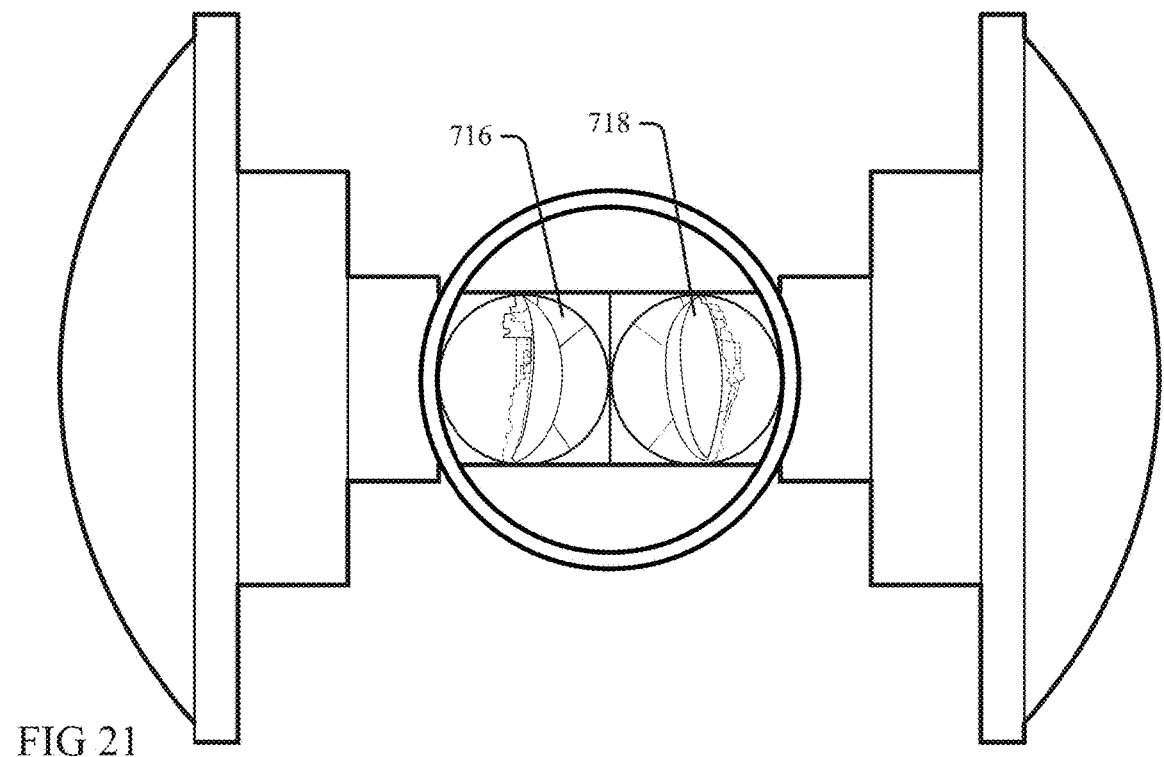
FIG. 21 is a graphic illustration of an image-forming lens system and of projected visual information of image outputs of lens elements according to the present invention.

Referring now to FIG. 19, in most conventional optical lens systems the output of the lens is a single image circle 702, which is projected over a rectangular image sensor 704 such that the sensor is inscribed in the image circle and the edges 703 of the circle (the remainder portions outside of the area defined by the rectangular image sensor 704) are consequently cropped. In the proposed invention, such as in the embodiments of FIGS. 15-17, multiple complete image circles 716 and 718 are all projected entirely within the confines of the sensor area 704, one from each of the lenses 602 and 604. FIG. 20 is a graphic illustration of the projected visual information or data of the image circles 716 and 718. FIG. 21 is a graphic illustration of the embodiment of FIGS. 15-17 depicting the visual data of the image circles 716 and 718 as projected upon the mirrored reflective surfaces 620 and 622, as provided by the respective fisheye lenses 602 and 604 and focused by the relay lenses 610 and 612.

Figure 22:
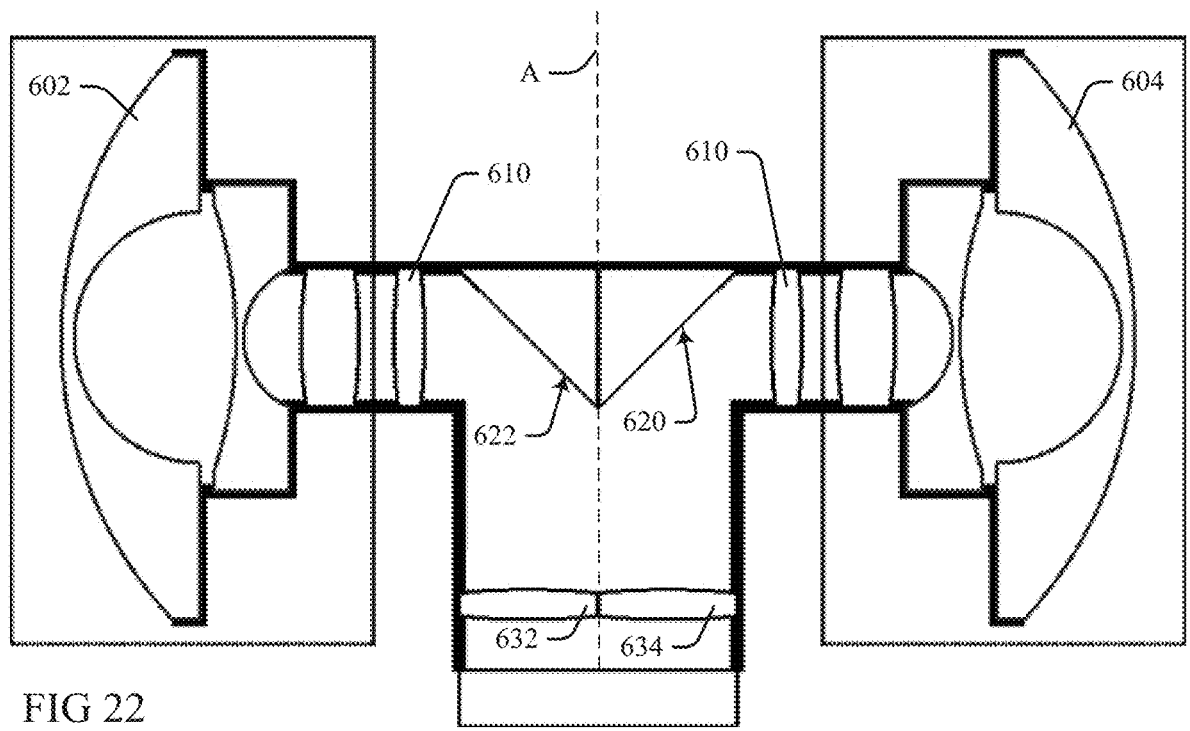
FIG. 22 is a schematic illustration of another embodiment of the present invention.

FIG. 22 is a schematic illustration of another embodiment of the present invention, wherein the lenses 602 and 604 are standard fisheye lenses with 185 degrees field-of-view (FOV), and the mirrored reflective surfaces 620 and 622 are planar surfaces 110 (FIG. 6) located 45 degrees from a central axis A. However, this example is non-limiting, and in another embodiment the mirrored reflective surfaces 620 and 622 are odd aspheric contour surfaces 112 (FIG. 6) defined relative to the central axis A.

Figure 23:
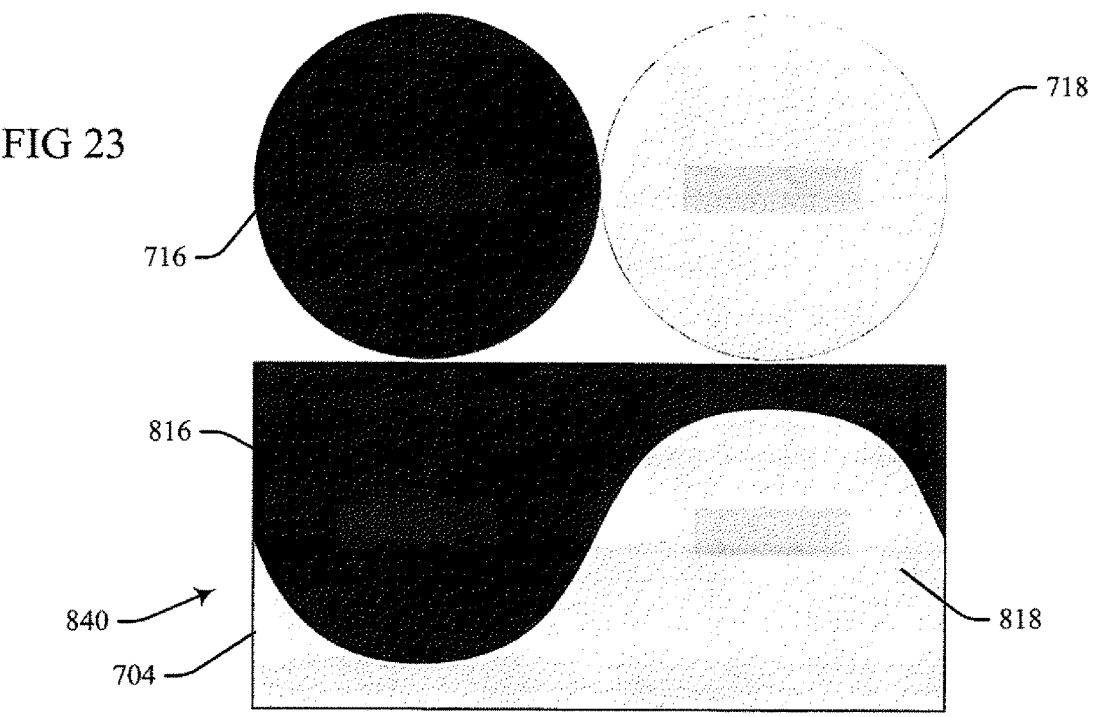
FIG. 23 is a graphic illustration of image data according to the present invention.

Once recorded, the individual projected image circles 716 and 718 can be digitally stitched together or otherwise geometrically distorted to form a single image or map with a field of view equal to the non-overlapping sum of the image data from all the individual lenses 602 and 604 in the assembly. FIG. 23 illustrates one example wherein the image data of the image circle 716 is re-arranged and formed into a first curvilinear shape 816 and the image data of the image circle 718 is re-arranged and formed into a second curvilinear shape 818 that complements the first shape 816, wherein a combination image 840 formed from the curvilinear shapes 816 and 818 fill the rectangular image sensor area 704. Thus, in one example wherein each of the image circle visual data 716 and 718 comprise 180 degrees of a field of view surrounding the assembly, the composite image 840 is a geometric remapping of the two circles 716 and 718 of 180° field of view into one image 840 having 360 degrees (a totality) of the field of view surrounding the assembly.

Figure 24:
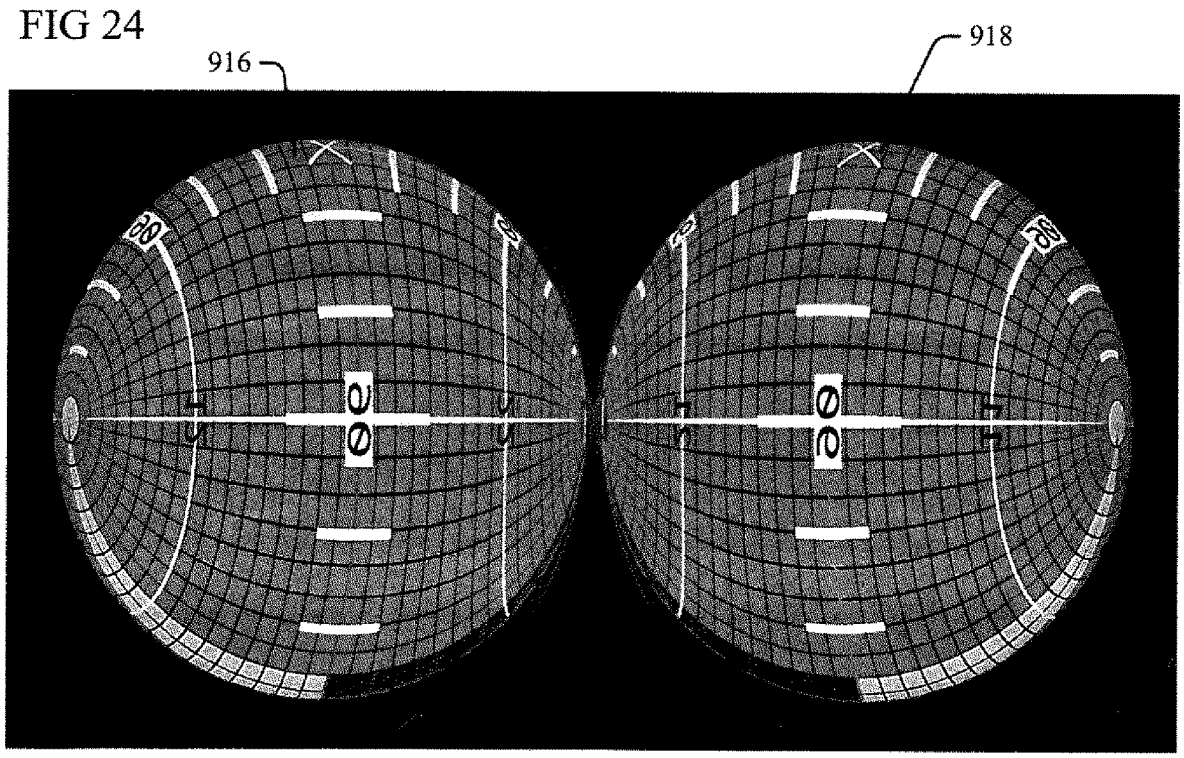
FIG. 24 is a graphic illustration of polar coordinate representations of image circle visual data according to an embodiment of the present invention.

FIG. 24 is a graphic illustration of a polar coordinate representation 916 of the image circle visual data 716, and a polar coordinate representation 918 of the image circle visual data 718. One skilled in the art will appreciate that the polar coordinate representation data 916 and 918 may be processed to generate the combination image 840, or other combination image, from the image circle visual data 716 and 718.

Various means of recording or projecting panoramic or fully spherical images are taught by the prior art. Existing systems for the capture of spherical imagery involve either a single camera capable of recording a field of view less than a complete sphere, or an array of multiple cameras arranged to record an overlapping set of images covering the full sphere, and which must be recombined digitally to create a final spherical output. Conventional multi-camera systems can produce high quality images, but are inconvenient to set up and use. Image data must be extracted from each camera individually, and then digitally processed in order to create a final image. Single-camera systems are not capable of filling in the complete spherical field: a full 360 degree horizontal range is covered, but the vertical range is limited. Parabolic mirrors cover a central strip of image, but have large gaps at the poles of the sphere. Fisheye lenses cover one pole completely and can extend beyond the sphere's equator, but leave the opposing pole and much of the surrounding hemisphere blank.

Aspects of the present invention provide new and advantageous ways of recording spherical content. Aspects combine image data from traditional fisheye or super wide angle lenses that each cover different portions of a field of view into a novel assembly wherein the outputs of multiple lenses are projected simultaneously onto a single image plane. Aspects enable a single camera system to capture the full 360 degree horizontal by 180 degree vertical spherical panorama, combining the advantages of two extant systems and minimizing their deficiencies. Aspects provide the field of view of a multi-camera rig, but with the convenience of using only a single camera, without requiring other specialized optics.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Figure 25:
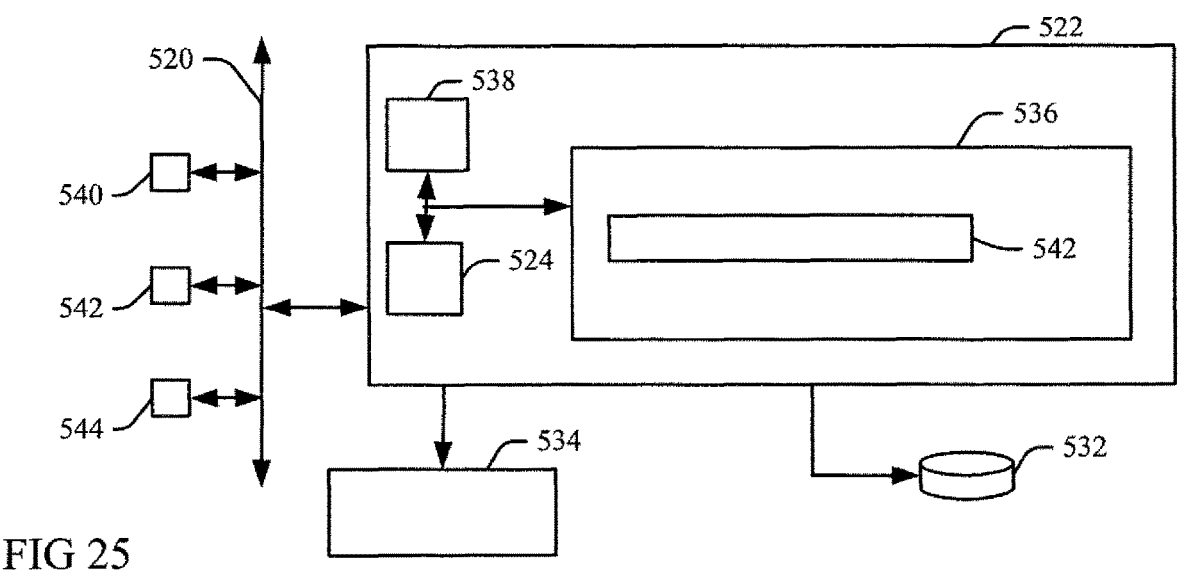
FIG. 25 depicts a computerized aspect according to an embodiment of the present invention.

Referring now to FIG. 25, an exemplary computerized implementation of an aspect of the present invention includes a computer system or other programmable device 522 in communication 520 with one or more focal plane sensors 540, 542 and/or 544, for example that receive the image projection data from the odd aspheric contour surface 112 as described above. The programmable device 522 is also in communication with one or more image data capture devices. The programmable device 522 is further in communication with a display screen 534 and a storage device 532.

Instructions 542 reside within computer readable code in a computer readable memory 536, or in a computer readable storage system 532 that is accessed by a Central Processing Unit (processor or CPU) 538 of the programmable device 522. An input/output device (I/O) 524 further enables wireless communications and other inputs and outputs. Thus, the instructions, when implemented by the processor 538, cause the processor 538 to display to a user via the display screen 534, an image of surroundings of the user from image data captured by the image capture device 542; display via the display screen 534; photographic representation of a surrounding scene is generated from the converted, rectilinear visual information (data). In some examples the processor 538 re-arranges and/or forms image data of image circles of individual lenses into different, complementary curvilinear shapes that are combined into combination images that fill image sensor areas, as described above.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
a generally conical element defined about a vertical axis and having a tip on the vertical axis, and a generally conical odd aspheric contour mirror surface that is defined upward from the tip relative to the vertical axis; and
a toroidal lens element disposed to receive reflected light from the odd aspheric contour mirror surface, wherein the toroidal lens element has a cross-section shape defined relative to a plane passing through the toroidal lens element and including the vertical axis and is defined by revolving a convex or concave lens surface cross-section shape around the vertical axis, wherein the convex or concave lens surface cross-section shape is defined from another axis that is parallel to the vertical axis but offset by an offset distance, and wherein the toroidal lens element cross-sectional shape is constant in rotation about the vertical axis and imparts a generally toroid shape to the toroidal lens element relative to the vertical axis; and
wherein the cross-sectional shape of the toroidal lens element is selected to capture light data input of a surrounding scene that is reflected from the generally conical odd aspheric contour mirror surface, and to translate the captured light data into image projection data directed toward at least one of an image plane for receipt by at least one light sensitive sensor, and another lens system.

2. The system according to claim 1, wherein the generally conical odd aspheric contour mirror surface corrects for visual distortion or chromatic aberrations.

3. A method for capturing image information from a surrounding scene, the method comprising:
capturing light input from a surrounding scene via at least one lens element that is disposed about a generally conical element that is defined about a vertical axis and having a tip on the vertical axis, and a generally conical odd aspheric contour mirror surface that is defined upward from the tip relative to the vertical axis; and
translating, via a toroidal lens element disposed to receive reflected light from the odd aspheric contour mirror surface, the captured light input into projection data that is oriented toward at least one of an image plane for receipt by at least one light sensitive sensor, and another lens system; and
wherein the toroidal lens element has a cross-section shape defined relative to a plane passing through the toroidal lens element and including the vertical axis and is defined by revolving a convex or concave lens surface cross-section shape around the vertical axis, wherein the convex or concave lens surface cross-section shape is defined from another axis that is parallel to the vertical axis but offset by an offset distance, and wherein the toroidal lens element cross-sectional shape is constant in rotation about the vertical axis and imparts a generally toroid shape to the toroidal lens element relative to the vertical axis; and
wherein the cross-sectional shape of the toroidal lens element is selected to capture the light data input of a surrounding scene that is reflected from the generally conical odd aspheric contour mirror surface and to translate the captured light data into the image projection data directed toward the at least one of an image plane for receipt by at least one light sensitive sensor and the another lens system.

4. The method of claim 3, wherein the image projection data is polar projection data, the method further comprising:
converting the image polar projection data into *recta*-linear visual information.

5. The method of claim 4, further comprising:
generating a photographic representation of the surrounding scene from the rectilinear visual information.

6. The method of claim 4, further comprising:
combining the different, complementary curvilinear shapes into the combination image that fills the image sensor area by combining the rectilinear visual information.

7. The method of claim 3, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the translating the captured light input into projection data that is oriented toward the at least one of the image plane for receipt by at least one light sensitive sensor and the another lens system.

8. The method of claim 7, wherein the computer-readable program code is provided as a service in a cloud environment.

9. A method for capturing image information from a surrounding scene, the method comprising:
forming image projection data of image circles of a plurality of individual lenses into different, complementary curvilinear shapes, wherein the image projection data is polar projection data;
converting the image polar projection data into *recta*-linear visual information; and
combining the *recta*-linear visual information converted from the image polar projection data of the different, complementary curvilinear shapes into a combination image that fills an image sensor area.

10. The method of claim 9, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the forming the image projection data of the image circles of the plurality of individual lenses into the different, complementary curvilinear shapes and the combining the *recta*-linear visual information converted from the image polar projection data of the different, complementary curvilinear shapes into the combination image that fills an image sensor area.

11. The method of claim 10, wherein the computer-readable program code is provided as a service in a cloud environment.

12. The method of claim 9, further comprising:
generating a photographic representation of the surrounding scene from the rectilinear visual information.

13. The method of claim 9, further comprising:
combining the different, complementary curvilinear shapes into the combination image that fills the image sensor area by combining the rectilinear visual information.

* * * * *